United States Patent

Heeren et al.

[11] Patent Number: 6,134,770
[45] Date of Patent: Oct. 24, 2000

[54] METHOD FOR ALIGNING HEAD SUSPENSION STRUCTURES

[75] Inventors: Thomas F. Heeren, Hutchinson, Minn.; Kirk J. Van Dreel, New London, Wis.; Raymond R. Wolter, Hutchinson, Minn.

[73] Assignee: Hutchinson Technology Incorporated, Hutchinson, Minn.

[21] Appl. No.: 09/301,060

[22] Filed: Apr. 28, 1999

Related U.S. Application Data

[62] Division of application No. 09/003,605, Jan. 7, 1998, Pat. No. 5,920,444.

[51] Int. Cl.[7] ........................................................ G11B 5/42
[52] U.S. Cl. ............................................. 29/603.03; 269/50
[58] Field of Search ........................... 29/603.03, 603.04, 29/603.05, 603.06; 269/50–52; 360/103, 104

[56] References Cited

U.S. PATENT DOCUMENTS

| 4,964,941 | 10/1990 | Von Brandt et al. |
|---|---|---|
| 5,434,731 | 7/1995 | Hagen . |
| 5,491,597 | 2/1996 | Bennin et al. |
| 5,535,074 | 7/1996 | Lueng . |
| 5,570,249 | 10/1996 | Aoyagi et al. |
| 5,771,136 | 6/1998 | Girard . |
| 5,986,852 | 11/1999 | Berg et al. ............................ 360/104 |

Primary Examiner—Carl E. Hall
Attorney, Agent, or Firm—Faegre & Benson LLP

[57] ABSTRACT

A method for aligning head suspension structures minimize to misalignments between a flexure and a load beam of the head suspension. The load beam and the flexure of the head suspension include a first aperture formed near a load point dimple of the head suspension to provide a reference datum. An elongated alignment aperture is formed in the rigid region of the load beam, and a proximal alignment aperture and a distal alignment aperture are formed in the flexure. The elongated the aperture overlaps at least a portion of the proximal and distal alignment apertures in such a manner that the proximal perimeter edge of the elongated aperture encroaches on the proximal alignment aperture and the proximal perimeter edge of the distal alignment aperture encroaches upon the elongated alignment aperture. This configuration of apertures allows the flexure and load beam to be independently aligned relative to each other by pins of an alignment tool that engage the proximal perimeter edge of the distal alignment aperture and the proximal perimeter edge of the elongated alignment aperture.

8 Claims, 11 Drawing Sheets

METHOD FOR ALIGNING HEAD SUSPENSION STRUCTURES

REFERENCE TO RELATED APPLICATION

This is a divisional application of U.S. patent application Ser. No. 09/003,605, filed Jan. 7, 1998, now U.S. Pat. No. 5,920,444, and entitled, "Flexure and Load Point Alignment Structure in a Head Suspension", the entire disclosure of which is hereby incorporated by reference for all purposes.

TECHNICAL FIELD

The present invention relates to an improved head suspension for use in dynamic storage devices and to the manner of constructing such an improved head suspension. In particular, the present invention provides features to head suspension components for efficiently and accurately processing the components during assembly of the head suspension. The present invention also provides a tool for efficiently and accurately processing and aligning the head suspension components and for aligning other components to the head suspension.

BACKGROUND OF THE INVENTION

In a dynamic storage device, a rotating disk is employed to store information in small magnetized domains strategically located on the disk surface. The disk is attached to and rotated by a spindle motor mounted to a frame of the disk storage device. A "head slider" (also commonly referred to simply as a "slider") having a magnetic read/write head is positioned in close proximity to the rotating disk to enable the writing and reading of data to and from the magnetic domains on the disk. The head slider is supported and properly oriented in relationship to the disk by a head suspension that provides forces and compliances necessary for proper slider operation. As the disk in the storage device rotates beneath the slider and head suspension, the air above the disk similarly rotates, thus creating an air bearing which acts with an aerodynamic design of the head slider to create a lift force on the head slider. The lift force is counteracted by the head suspension, thus positioning the slider at a height and alignment above the disk which is referred to as the "fly height."

Typical head suspensions include a load beam, a flexure, and a base plate. The load beam normally includes a mounting region at a proximal end of the load beam for mounting the head suspension to an actuator of the disk drive, a rigid region, and a spring region between the mounting region and the rigid region for providing a spring force to counteract the aerodynamic lift force acting on the slider described above. The base plate is mounted to the mounting region of the load beam to facilitate the attachment of the head suspension to the actuator. The flexure is positioned at the distal end of the load beam, and typically includes a gimbal region having a slider mounting surface to which the slider is mounted and thereby supported in read/write orientation with respect to the rotating disk. The gimbal region is resiliently moveable with respect to the remainder of the flexure in response to the aerodynamic forces generated by the air bearing.

In one type of head suspension, the flexure is formed as a separate component and further includes a load beam mounting region that is rigidly mounted at the distal end of the load beam using conventional means, such as spot welds. In such a flexure, the gimbal region extends distally from the load beam mounting region of the flexure and includes a cantilever beam to which the slider is mounted. A generally spherical dimple that extends between the load beam and the slider mounting surface of the flexure is formed in either the load beam or the slider mounting surface of the flexure. The dimple transfers the spring force generated by the spring region of the load beam to the flexure and the slider to counteract the aerodynamic force generated by the air bearing between the slider and the rotating disk. In this manner, the dimple acts as a "load point" between the flexure/slider and the load beam. The load point dimple also provides clearance between the cantilever beam of the flexure and the load beam, and serves as a point about which the slider can gimbal in pitch and roll directions in response to fluctuations in the aerodynamic forces generated by the air bearing.

Electrical interconnection between the head slider and circuitry in the disk storage device is provided along the length of the head suspension. Conventionally, conductive wires encapsulated in insulating tubes are strung along the length of the head suspension between the head slider and the storage device circuitry. Alternatively, an integrated lead head suspension, such as that described in commonly assigned U.S. Pat. No. 5,491,597 to Bennin et al., that includes one or more conductive traces bonded to the load beam with a dielectric adhesive can be used to provide electrical interconnection. Such an integrated lead head suspension may include one or more bonding pads at the distal end of the traces to which the head slider is attached and that provide electrical interconnection to terminals on the head slider. The conductive trace can also be configured to provide sufficient resiliency to allow the head slider to gimbal in response to the variations in the aerodynamic forces.

As the number and density of magnetic domains on the rotating disk increase, it becomes increasingly important that the head slider be precisely aligned over the disk to ensure the proper writing and reading of data to and from the magnetic domains. Moreover, misalignments between the head slider and the disk could result in the head slider "crashing" into the disk surface as the slider gimbals due to the close proximity of the head slider to the rotating disk at the slider fly height.

The position of the head suspension and the head slider, also known as the static attitude, is calibrated so that when the disk drive is in operation the head slider assumes an optimal orientation at the fly height. It is therefore important that the static attitude of the head suspension be properly established. Toward this end, the flexure must be mounted to the load beam so that misalignments between the flexure and the load beam are minimized since misalignments between the load beam and flexure may introduce a bias in the static attitude of the head suspension and the head slider. It is also important that the load point dimple be properly formed on the head suspension so that it is properly positioned in relation to the head slider when the head slider is mounted to the head suspension. Misalignments between the load point dimple and the head slider may cause a torque to be exerted on the head slider, and thus affect the fly height of the head slider and the orientation of the head slider at the fly height. These concerns are emphasized when integrated leads are used to provide electrical interconnection since the bond pads of the integrated leads (to which the head slider is bonded) are directly affected by the positioning of the flexure.

To assist in the alignment of the head suspension components and in the formation of head suspension features, the head suspension typically includes reference apertures that are engaged by an alignment tool. The apertures are longitudinally spaced apart and are formed in the rigid region of the load beam. In head suspensions that include a separate flexure mounted to the load beam, the flexure includes corresponding apertures formed in the load beam mounting region of the flexure. The reference apertures in the load beam and the flexure are typically circular, and are sized and positioned so as to be substantially concentric when the flexure is mounted to the load beam. In an approach illustrated in U.S. Pat. No. 5,570,249 to Aoyagi et al., rather than being circular, a distal aperture in the load beam is elongated and generally elliptical. The aperture includes a "v" shaped portion at one end.

Rigid cylindrical pins on an alignment tool are used to align the individual head suspension components. The rigid pins are spaced apart an amount equal to the longitudinal spacing between the reference apertures in the components. The pins are inserted into and engage the apertures in the load beam and flexure, and in this manner concentrically align the apertures, and thus the load beam and the flexure, to one another. The components can then be fastened together, as by wading or other known processes.

There are certain deficiencies and shortcomings associated with prior art head suspensions, however. Conventional reference apertures such as those described above include manufacturing tolerances that affect the interface between the alignment tool and the head suspension component. The pins on the alignment tools also include manufacturing and positioning tolerances. These tolerances are cumulative so as to affect the alignment of individual head suspension components, and affect the forming of head suspension features, such as a load point dimple. In addition, when aligning individual head suspension components, the manufacturing tolerances in the apertures of the load beam and the flexure are "stacked" together because the head suspension components are engaged by common alignment pins, thus creating additional alignment problems. An additional shortcoming is that the alignment pins must typically be manufactured somewhat undersized so as to still be useable when the flexure and load beam apertures overlap each other to create a smaller through-hole for the pins to be inserted in due to manufacturing tolerances and misalignments in the head suspension components. Moreover, because the pins of the alignment tool are spaced apart a fixed distance, the pins may not be able to engage the reference apertures due to the manufacturing tolerances in the apertures.

SUMMARY OF THE INVENTION

The present invention overcomes the deficiencies and shortcomings of the prior art by providing an improved head suspension for use in a dynamic storage device and for supporting a head slider over a disk surface wherein features are formed in the head suspension that assist in the efficient and accurate alignment of the head suspension components.

A head suspension in accordance with the present invention comprises a load beam and a flexure. The load beam has a proximal end and a distal end, and further comprises an actuator mounting region at the proximal end, a load region at the distal end of the load beam, a spring region positioned distally from the actuator mounting region, and a rigid region between the spring region and the loading region. The load beam has a first load beam aperture formed in the load region of the load beam. The flexure comprises a gimbal region and a load beam mounting region, and is mounted at the distal end of the load beam. The flexure has a first flexure aperture formed in the load beam mounting region that is adjacent and coincident with the first load beam aperture when the flexure is aligned over the load beam. An elongated alignment aperture is formed in one of the load beam and the flexure, and a proximal alignment aperture and distal alignment aperture are formed in the other of the load beam and the flexure. The elongated aperture overlaps at least a portion of each of the proximal alignment aperture and the distal alignment aperture so that the proximal perimeter edge of the elongated alignment aperture encroaches upon the proximal alignment aperture and the proximal perimeter edge of the distal alignment aperture encroaches upon the elongated alignment aperture.

The present invention is also directed to a method and apparatus for aligning a load beam and flexure utilizing the characteristic features set out above.

DETAILED DESCRIPTION OF THE INVENTION

Figure 1:
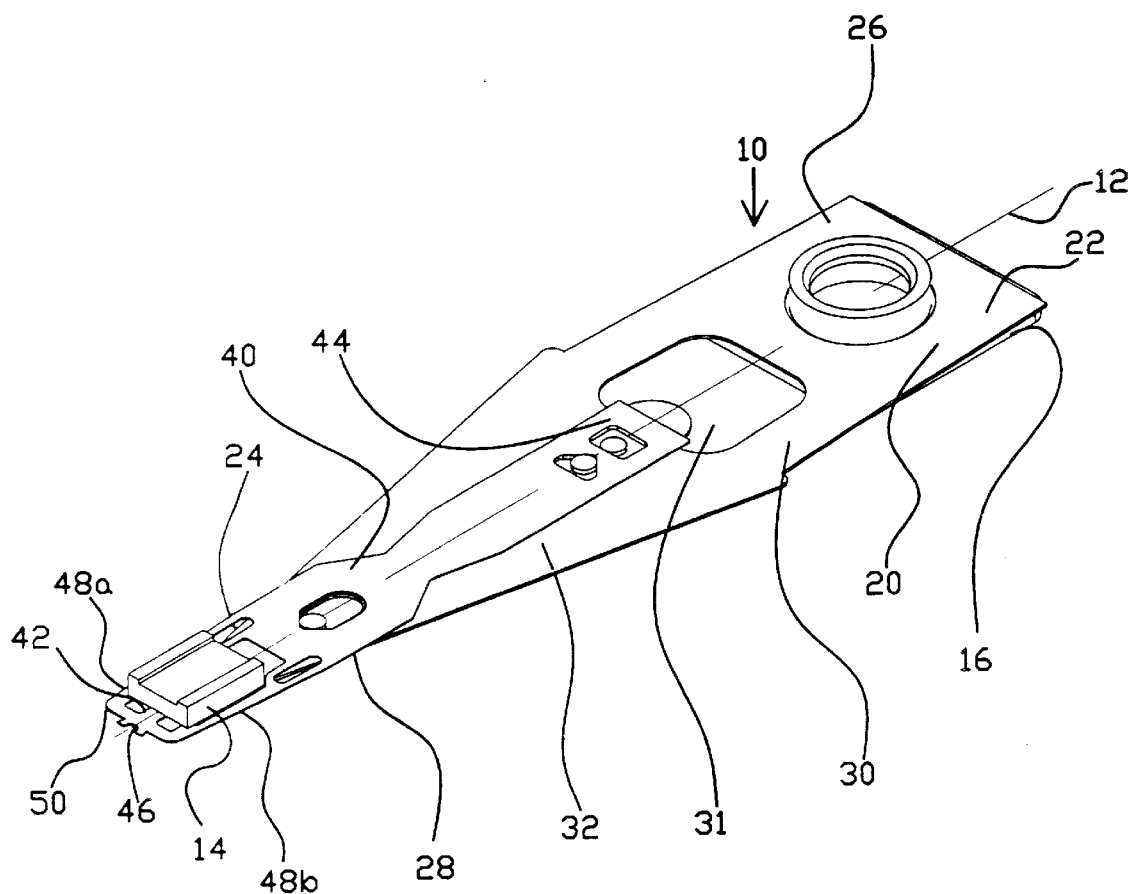
FIG. 1 is an isometric view of a head slider in combination with a head suspension in accordance with the present invention.

The present invention is a head suspension having structures useful in minimizing misalignments in the head suspension and a method of manufacturing such a head suspension. FIG. 1 shows a head suspension 10 in accordance with the present invention. Head suspension 10 is used to support and properly orient a head slider 14 over a rotating disk (not shown ) in a magnetic disk storage device, as is known in the art. Head suspension 10 has a longitudinal axis 12, and is comprised of a base plate 16, a load beam 20, and a flexure 40. Base plate 16 is mounted to a proximal end 22 of load beam 20, and is used to attach head suspension 10 to an actuator (not shown) in the disk drive. Slider 14 is mounted to flexure 40, and as the disk in the storage device rotates beneath head slider 14, an air bearing is generated between slider 14 and the rotating disk which creates a lift force on head slider 14. This lift force is counteracted by a spring force generated by the load beam 20 of head suspension 10, thereby positioning the slider 14 at an alignment above the disk referred to as the "fly height." As described in greater detail below, flexure 40 provides compliances necessary to allow head slider 14 to gimbal in response to small variations in the air bearing generated by the rotating disk.

Load beam 20 of head suspension 10 has an actuator mounting region 26 at proximal end 22, a load region 28 adjacent to a distal end 24, a resilient spring region 30 positioned adjacent actuator mounting region 26, and a rigid region 32 that extends between spring region 30 and load region 28. Resilient spring region 30 generates a predetermined spring force that counteracts the lift force of the air bearing acting on head slider 14. Toward this end, spring region 30 can include an aperture 31 to control the spring force generated by spring region 30. Rigid region 32 transfers the spring force to load region 28 of load beam 20. A load point dimple 34 (shown in FIG. 3) is formed in load region 28, and contacts flexure 40 to transfer the spring force generated by spring region 30 to flexure 40 and head slider 14. A load point dimple can alternatively be formed in flexure 40 to extend toward and contact load region 28 of load beam 20.

Figure 2:
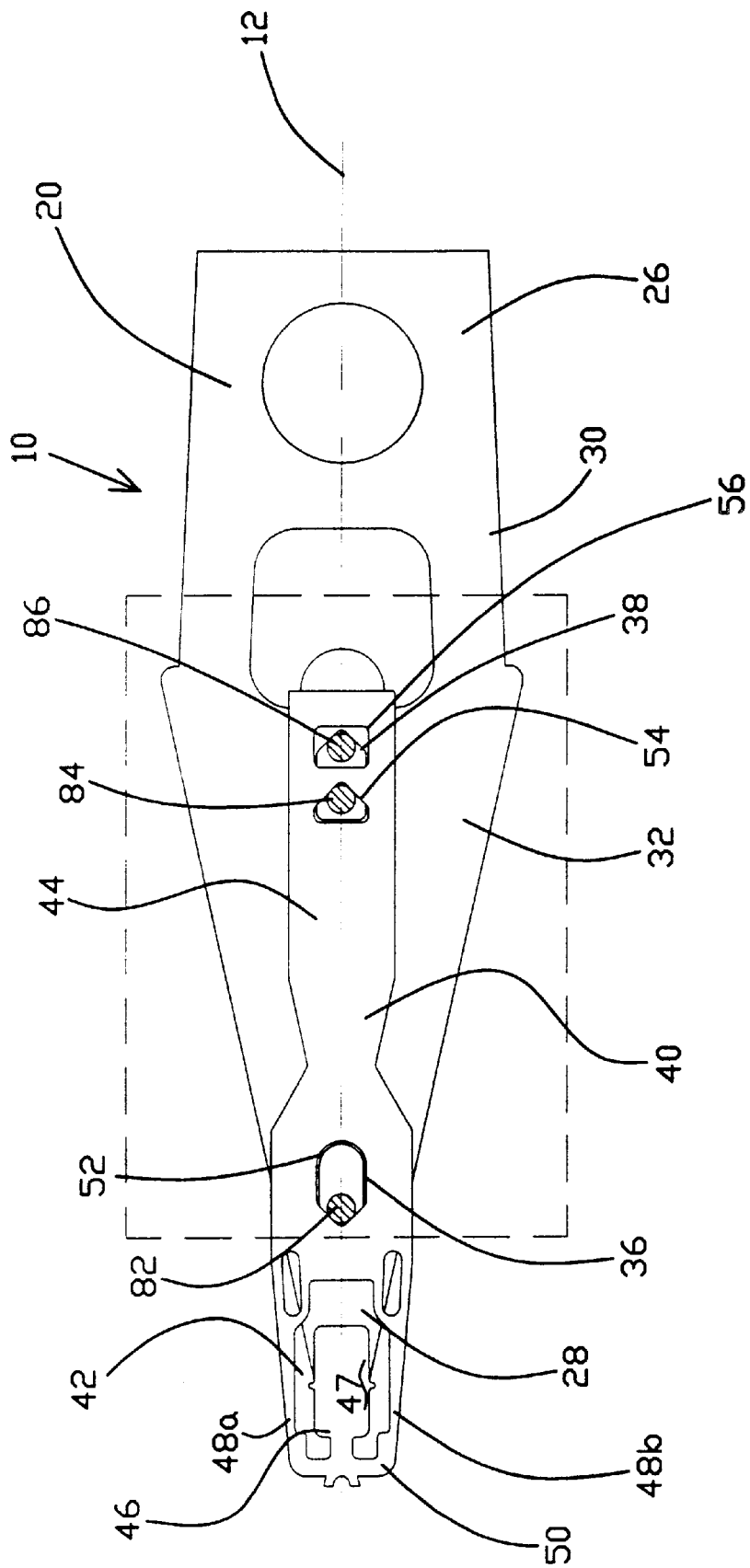
FIG. 2 is a view from the top of FIG. 1 of the head suspension positioned schematically onto an alignment tool for illustrating the alignment of the flexure to the load beam.
Figure 3:
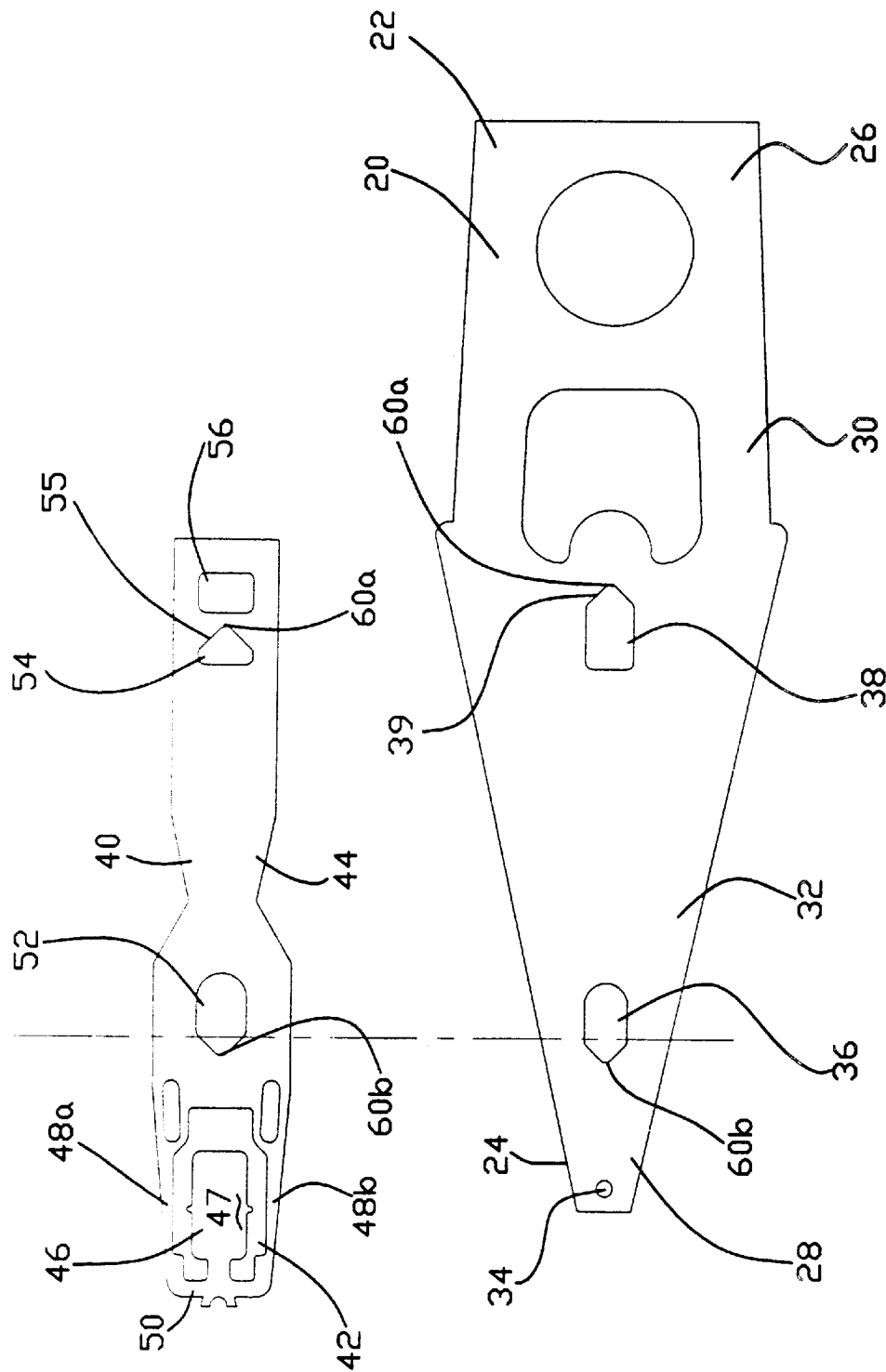
FIG. 3 is an exploded plan view of the head suspension of FIGS. 1 and 2 showing the individual head suspension components in greater detail.

In the head suspension shown in FIGS. 1–3, flexure 40 is formed as a separate component and is mounted to load beam 20 near the distal end 24. Flexure 40 includes a gimbal region 42 and a load beam mounting region 44. Load beam mounting region 44 overlaps and is mounted to a portion of rigid region 32 using conventional means, such as spot welds. Gimbal region 42 of flexure 40 provides the necessary compliances to allow head slider 14 to gimbal in both pitch and roll directions about load point dimple 34 in response to fluctuations in the air bearing generated by the rotating disk. Toward this end, gimbal region 42 includes a cantilever beam 46 having a slider mounting surface 47 to which head slider 14 is attached. Cantilever beam 46 is attached to cross piece 50, which is connected at each end to first and second arms 48a and 48b of flexure 40. Cantilever beam 46 is resiliently movable in both pitch and roll directions with respect to the remainder of flexure 40, and thereby allows head slider 14 to gimbal. Load point dimple 34 (when formed in load region 28) contacts the surface opposite the slider mounting surface 47 of cantilever beam 46 to transfer the spring force generated by spring region 30 of load beam 20 to head slider 14, and further to provide a point about which head slider 14 and cantilever beam 46 can gimbal.

Due to the high density of magnetic domains on the disk, and further due to the close proximity of head slider 14 to the rotating disk at the slider fly height, it is important that head slider 14 be properly aligned over the disk. Toward this end, it is highly desirable to minimize any misalignments in head suspension 10, particularly with respect to the alignment of the flexure 40 and the load beam 20. It is also highly desirable to minimize the misalignment between the head slider 14 and the load point dimple 34 when head slider 14 is mounted to head suspension 10.

In order to minimize the misalignments in head suspension 10, head suspension 10 includes a series of apertures formed in the components of head suspension 10. Specifically, load beam 20 includes a first load beam aperture 36 formed in the rigid region 32 (near the load region 28) of load beam 20. Flexure 40 similarly includes a first flexure aperture 52 formed in the load beam mounting region 44 of flexure 40. First load beam aperture 36 and first flexure aperture 52 can be the same size and shape, but need not be, and if flexure 40 is properly aligned over load beam 20, the first load beam aperture 36 and first flexure aperture 52 will be coincident. The proximal portion of first flexure aperture 52 can alternatively be slightly oversized as compared to first load beam aperture 36 to minimize material overlap between these apertures and to provide optimal tolerances at later processing steps. To assist in aligning the flexure 40 and load beam 20, first load beam aperture 36 and first flexure aperture 52 can receive and be engaged by a first pin 82 (see FIG. 2) of an alignment tool (shown in FIGS. 7–9 and described in greater detail below) to define a reference datum during the assembly of head suspension 10.

Additional apertures are formed in flexure 40 and load beam 20 to further assist in aligning these head suspension components relative to the reference datum defined at first load beam aperture 36 and first flexure aperture 52. Specifically, flexure 40 includes a distal flexure aperture 54 and a proximal flexure aperture 56. The distal flexure aperture 54 is formed proximal of first flexure aperture 52, and the proximal flexure aperture 56 is formed proximal of distal flexure aperture 54. Distal flexure aperture 54 and proximal flexure aperture 56 are preferably formed along the longitudinal axis 12 of head suspension 10, although other arrangements can be used depending on the particular application and its alignment strategy. The first flexure aperture 52 and the distal and proximal flexure apertures 54 and 56, respectively, can be formed using conventional techniques, such as etching. Load beam 20, on the other hand, includes an elongated alignment aperture 38 formed in rigid region 32, preferably also along the longitudinal axis 12 of head suspension 10. First load beam aperture 36 and elongated load beam aperture 38 can be formed using conventional techniques, such as etching. In the embodiment shown in FIGS. 1–4, elongated load beam aperture 38 is positioned so that at least portions of distal flexure aperture 54 and proximal flexure aperture 56 are accessible when flexure 40 is positioned over load beam 20. In this manner, the proximal perimeter edge 55 of distal flexure aperture 54 is visible and accessible through the elongated load beam aperture 38, and the proximal perimeter edge 39 of elongated load beam aperture 38 is visible and accessible through the proximal flexure aperture 56 during the aligning and mounting of flexure 40 to load beam 20. As described in detail below, this configuration of distal flexure aperture 54, proximal flexure aperture 56, and elongated load beam aperture 38 allows the flexure 40 and load beam 20 to be engaged by separate pins of an alignment tool for independently aligning the flexure 40 and the load beam 20.

Figure 4:
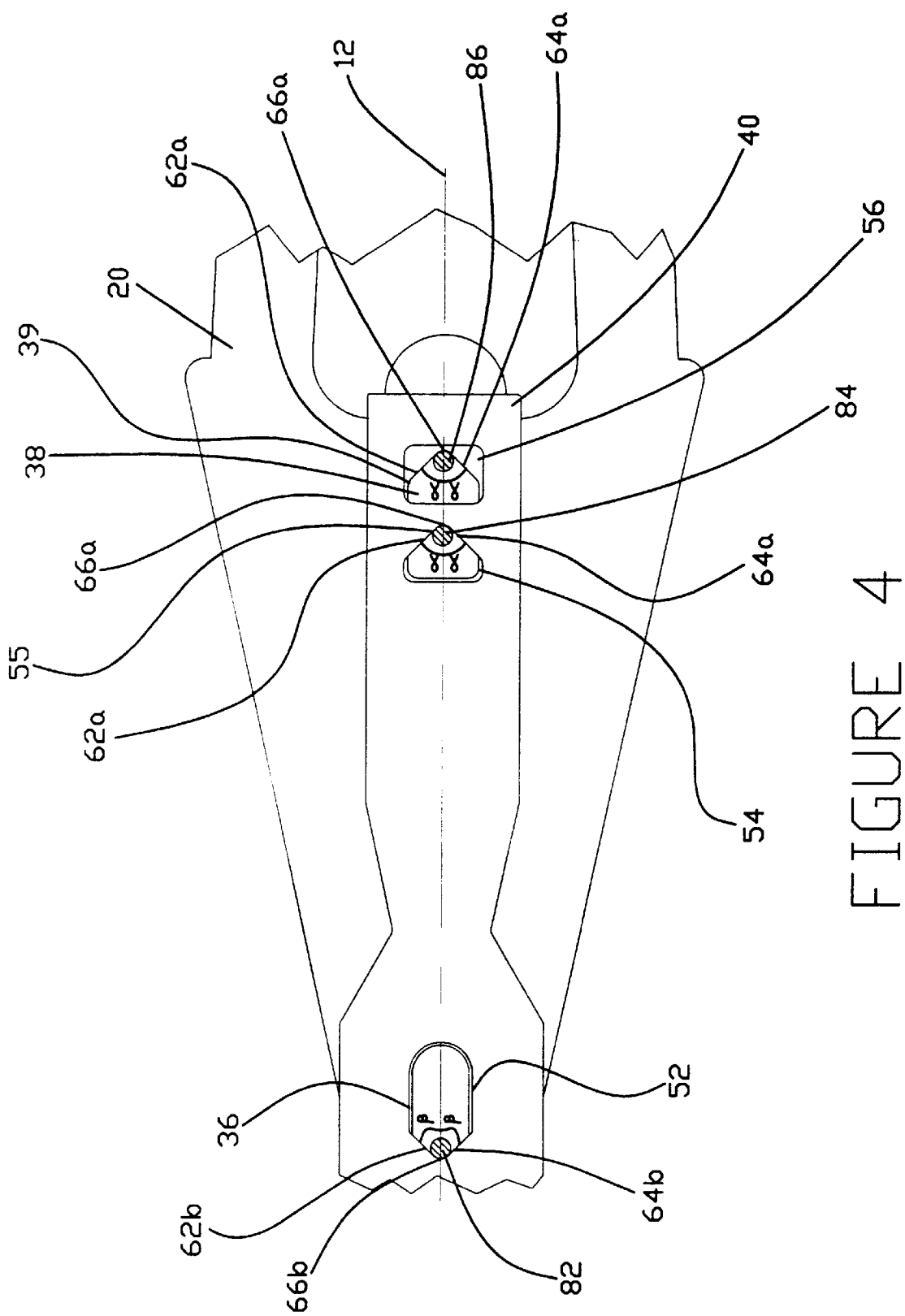
FIG. 4 is an enlarged plan view of the portion of the head suspension shown in dashed lines in FIG. 2 showing the alignment structure of the head suspension and its cooperation with alignment pins of the alignment tool in greater detail.

As best shown in FIG. 4, a first pin 82, a second pin 84, and a third pin 86 of an alignment tool (shown in FIGS. 7–9 and described below) are used to align flexure 40 to load beam 20 during the assembly of head suspension 10. First pin 82 is inserted through first load beam aperture 36 and first flexure aperture 52, second pin 84 is inserted through elongated load beam aperture 38 and distal flexure aperture 54, and third pin 86 is inserted through elongated load beam aperture 38 and proximal flexure aperture 56. Second pin 84 and third pin 86 are then longitudinally relatively displaced with respect to the first pin 82 to engage the flexure 40 and load beam 20. Specifically, when pins 84 and 86 are longitudinally relatively displaced with respect to the first pin 82, first pin 82 engages the distal end of the first load beam aperture 36 and first flexure aperture 52. Because elongated load beam aperture 38 is positioned over the proximal end 55 of distal flexure aperture 54, second pin 84 engages the proximal end 55 of distal flexure aperture 54 independent of load beam 20. Similarly, because proximal flexure aperture 56 is positioned over the proximal end 39 of elongated load beam aperture 38, third pin 86 engages the proximal end 39 of elongated load beam aperture 38 independent of flexure 40. In other words, this configuration of head suspension apertures allows second pin 84 and third pin 86 to independently engage and align the flexure 40 and load beam 20, respectively, relative to reference datum at first load beam aperture 36 and first flexure aperture 52. Such an alignment process prevents the stacking of manufacturing errors in the head suspension apertures as is common with traditional head suspensions, and misalignments between the flexure 40 and load beam 20 thus can be minimized during the assembly of head suspension 10.

The apertures formed in the flexure 40 and load beam 20 are preferably positioned along the longitudinal axis 12 of head suspension 10. In addition, elongated load beam aperture 38 is preferably longitudinally spaced apart from and in the same plane as the first load beam aperture 36, and distal flexure aperture 54 and proximal flexure aperture 56 are preferably longitudinally spaced apart from and in the same plane as the first flexure aperture 52 a distance that is the maximum amount mechanically and structurally possible. Apertures formed in this manner will minimize the effect of any manufacturing tolerances in the apertures of load beam 40 and flexure 20 and in the alignment tool during the alignment of flexure 40 to load beam 20.

In the embodiment shown in FIGS. 1–3, and as shown in greater detail in FIG. 4, first load beam aperture 36, elongated load beam aperture 38, first flexure aperture 52, distal flexure aperture 54, and proximal flexure aperture 56 further include structure that efficiently minimizes transverse misalignments in the flexure 40 and the load beam 20 during the alignment and mounting of flexure 40 to load beam 20. Specifically, as shown in FIG. 3, the proximal perimeter edge 39 of elongated load beam aperture 38 and the proximal perimeter edge 55 of distal flexure aperture 54 each include an alignment structure 60a, while the distal ends of first load beam aperture 36 and first flexure aperture 52 each include an alignment structure 60b.

As shown in FIG. 4, alignment structure 60a is generally comprised of a first side 62a and a second side 64a. In the embodiment shown, first side 62a and second side 64a are substantially linear. Because elongated load beam aperture 38 and distal flexure aperture 54 are positioned on longitudinal axis 12, first side 62a and second side 64a preferably intersect at points 66a on the longitudinal axis 12 of head suspension 10. First side 62a extends from intersection point 66a substantially distally along head suspension 10, and at an offset angle α from longitudinal axis 12 of head suspension 10. Second side 64a extends from intersection point 66a also substantially distally along head suspension 12, but is angled from longitudinal axis 12 by offset angle α in the opposite direction from that of first side 62a. In this manner, first side 62a and second side 64a define a "v" shaped alignment structure at the proximal end 55 of the distal flexure aperture 54 and at the proximal end 39 of the elongated load beam aperture 38.

Alignment structure 60b is formed in each of the distal ends of first load beam aperture 36 and the first flexure aperture 52. Alignment structure 60b can be substantially similar to the alignment structure 60a in elongated load beam aperture 38 and distal flexure aperture 54 described above. First and second sides 62b and 64b, respectively, of the alignment structure 60b in first load beam aperture 36 and first flexure aperture 52, however, extend proximally from intersection point 66b of the alignment structure 60b rather than distally as in structure 60a, and are angled by a second angle β from the longitudinal axis 12. In this manner, first side 62b and second side 64b define a "v" shaped alignment structure at the distal end of the first load beam aperture 36 and first flexure aperture 52.

First side 62a and second side 64a of structure 60a tangentially engage the alignment pins 84 and 86 during the assembly of head suspension 10. When pins 84 and 86 are longitudinally displaced from pin 82, pin 82 engages alignment structure 60b, while pin 84 engages alignment structure 60a in distal flexure aperture 54 and pin 86 engages alignment structure 60a in elongated load beam aperture 38. Because the intersection point 66a is coincident with the longitudinal axis 12 of head suspension 10, and because sides 62a and 64a of structure 60a are angled from axis 12 by an equal amount, sides 62a and 64a provide opposing transverse forces to alignment pins 84 and 86 as the pins engage sides 62a and 64a. In this manner, pins 84 and 86 are centered on the longitudinal axis 12 of head suspension 10. Sides 62b and 64b of alignment structure 60b similarly provide opposing transverse forces to pin 82, and center pin 82 along longitudinal axis 12 of head suspension 10. In this manner, the alignment structures 60a and 60b efficiently minimize the transverse misalignments in flexure 40 and load beam 20 during the assembly of head suspension 10.

Offset angle α in alignment structure 60a can range between zero degrees and ninety degrees, and is preferably about forty-five degrees to provide sufficient transverse forces to second and third pins 84 and 86 as they engage sides 62a and 64a of structure 60a. A forty-five degree angle is also preferred so as to avoid producing excessive forces that may damage sides 62a and 64a. Second angle β in alignment structure 60b also ranges between zero degrees and ninety degrees, and is preferably forty-five degrees. Angle β can also be slightly greater than angle α so as to provide structure that is more easily detected by a vision measurement system useful in the manufacturing of head suspension 10.

It is also contemplated that the alignment structures comprise other shapes than v-shapes. It is preferable that the alignment structure have the ability to self-center the flexure 40 and load beam 20 when relative movement is provided between pin 82 and pins 84 and 86. The shaped edges may be curved, including complex curves, stepped (depending on pin diameters) or the like.

While the head suspension 10 of FIGS. 1–4 shows elongated alignment aperture 38 formed in load beam 20, and the distal and proximal alignment apertures 54 and 56, respectively, formed in flexure 40, these apertures can alternatively be formed in the other head suspension component. For example, an elongated alignment aperture can be formed in the flexure of a head suspension and the distal and proximal alignment apertures can be formed in a load beam of a head suspension. The apertures, as described above, may also be provided to the flexure and load beam in reverse (i.e. distal and proximal alignment apertures provided near the distal end of the head suspension component). In addition, other configurations for the alignment apertures described above can be used (i.e. side-by-side apertures). It is desirable that the structure utilized allows the independent aligning of the flexure 40 and the load beam 20 with respect to a defined datum.

Figure 5:
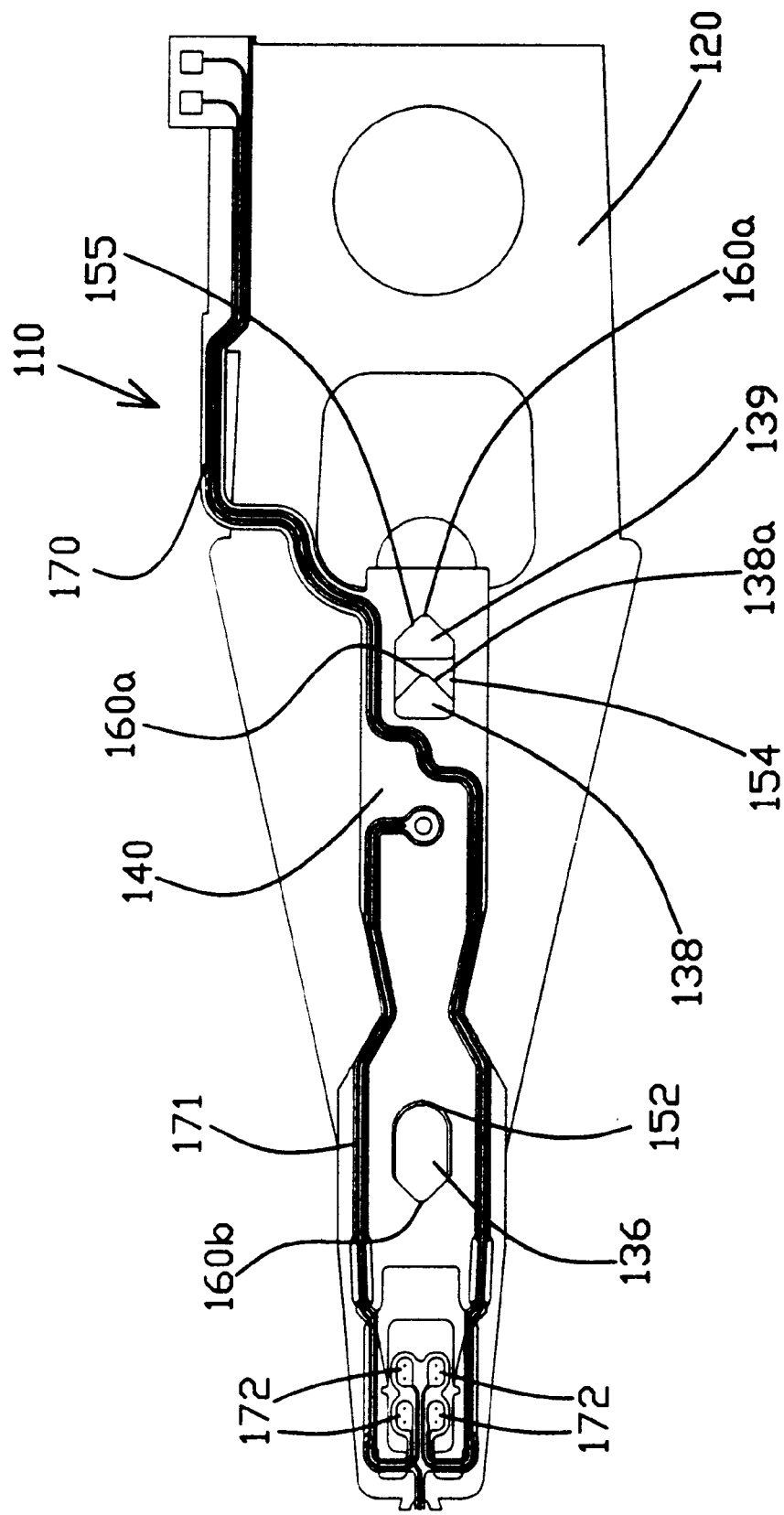
FIG. 5 is plan view of a second embodiment of a head suspension also in accordance with the present invention having integrated leads.
Figure 6:
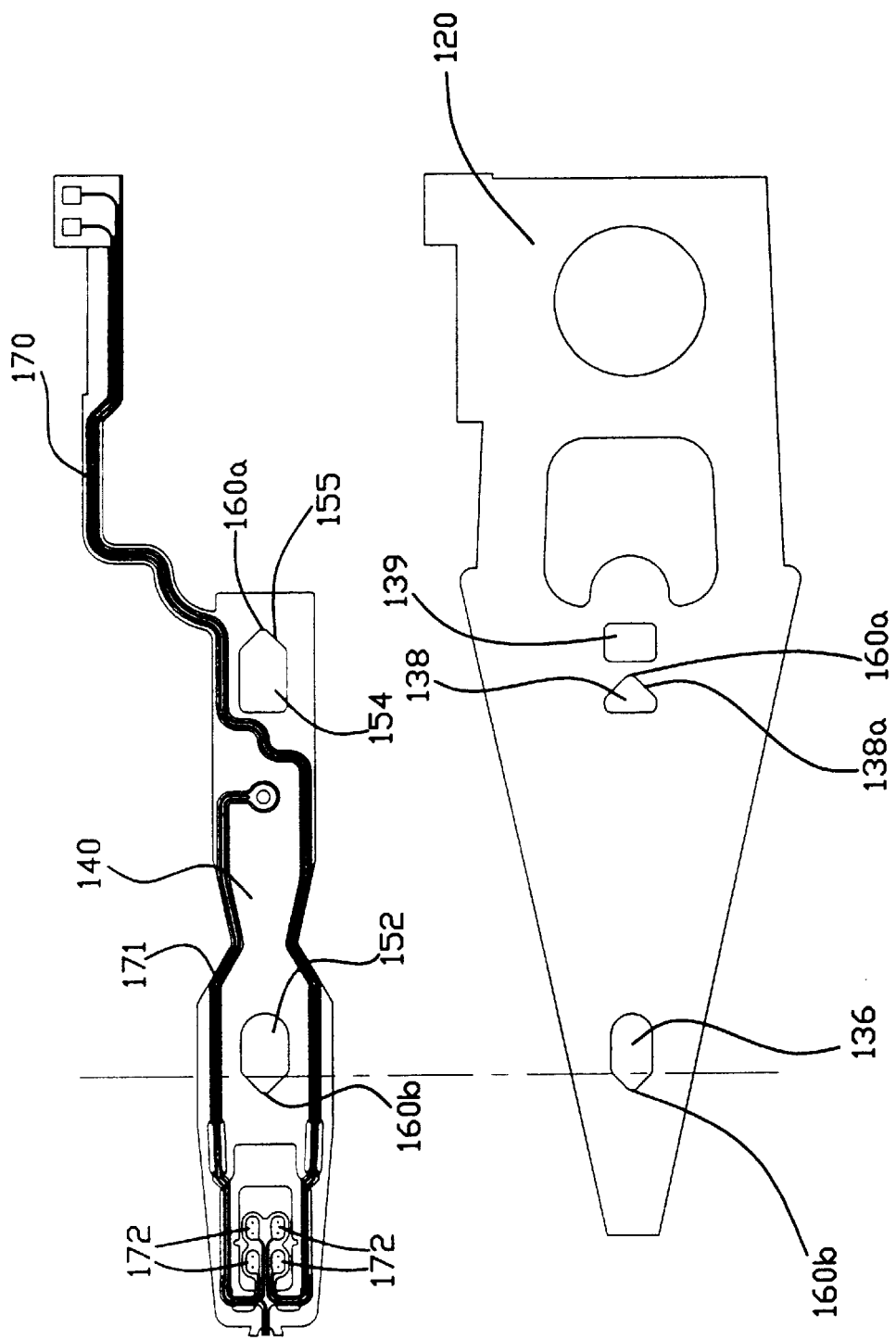
FIG. 6 is an exploded plan view of the head suspension of FIG. 5 showing the individual head suspension components in greater detail.

FIGS. 5 and 6 show a second embodiment of a head suspension in accordance with the present invention having such an alternative configuration of apertures. Many of the features of the second embodiment are similar to those shown in FIGS. 1–4 and described above, and similar reference numerals preceded by the prefix "1" are used to described these features. Head suspension 110 of FIGS. 5 and 6 includes a load beam 120 and flexure 140. Integrated leads 170 are formed on flexure 140 of head suspension 110 to provide electrical interconnection between a head slider and circuitry in the magnetic disk storage device in which head suspension 110 is mounted. Integrated leads 170 include one or more conductive traces 171 that provide such electrical interconnection, and traces 171 can terminate in a plurality of bond pads 172. The head slider can thus be mounted to bond pads 172, and bond pads 172 can be electrically interconnected to terminals on the head slider using conventional techniques, such as ultrasonic welding or solder balls.

Flexure 140 includes a first flexure aperture 152 similar to that shown in FIGS. 1–4 and described above, and an elongated alignment aperture 154 formed proximally of first flexure aperture 152. Load beam 120 includes a first load beam aperture 136 similar to that shown in FIGS. 1–4 and described above, a distal alignment aperture 138 formed proximally of first load beam aperture 136, and a proximal alignment aperture 139 formed proximally of distal load beam aperture 138. Elongated flexure aperture 154 overlaps the proximal perimeter end 138a of distal load beam aperture 138, while proximal load beam aperture 139 overlaps the proximal perimeter end 155 of elongated flexure aperture 154. Accordingly, the proximal perimeter edge 138a of distal load beam aperture 138 is visible and accessible through the elongated flexure aperture 154, while the proximal perimeter edge 155 of elongated flexure aperture 154 is visible and accessible through the proximal load beam aperture 139 when flexure 140 is positioned over load beam 120. In this manner, first load beam aperture 136 and first flexure aperture 152 can be engaged by a first pin on an alignment tool to define a reference datum, while elongated flexure aperture 154 receives and is engaged by a second pin of the alignment tool independent of the load beam 120, and distal load beam aperture 138 receives and is engaged by a third alignment pin independent of the flexure 140. Similar to the embodiment shown in FIGS. 1–4 and described above, first load beam aperture 136, first flexure aperture 152, distal load beam aperture 138, and elongated flexure aperture 154 can include alignment structures 160a and 160b that minimizes transverse misalignments in the head suspension components during the assembly of head suspension 110.

Figure 7:
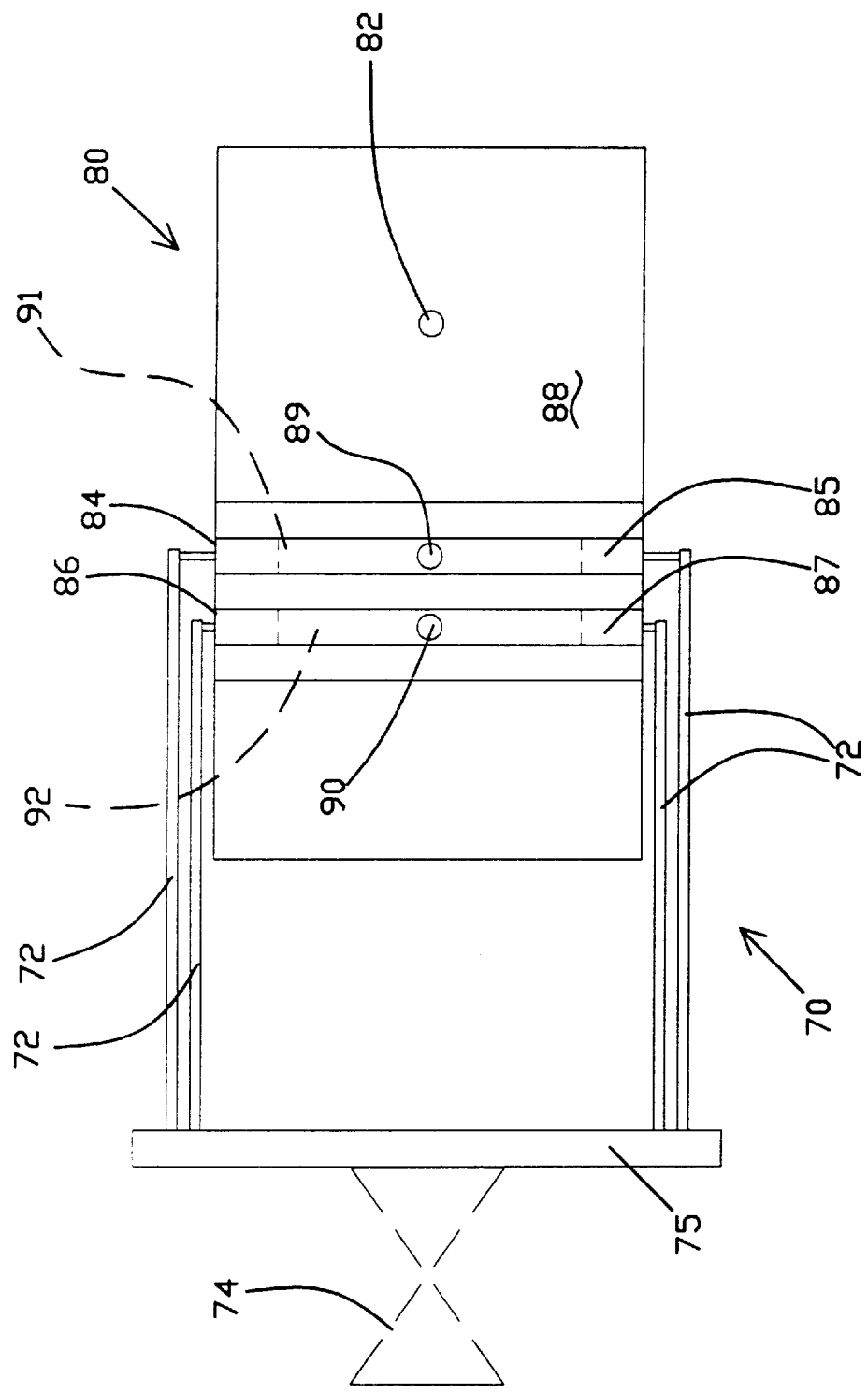
FIG. 7 is a top schematic view of an alignment tool in accordance with the present invention used to align head suspension components with its alignment pins in a neutral state.
Figure 8:
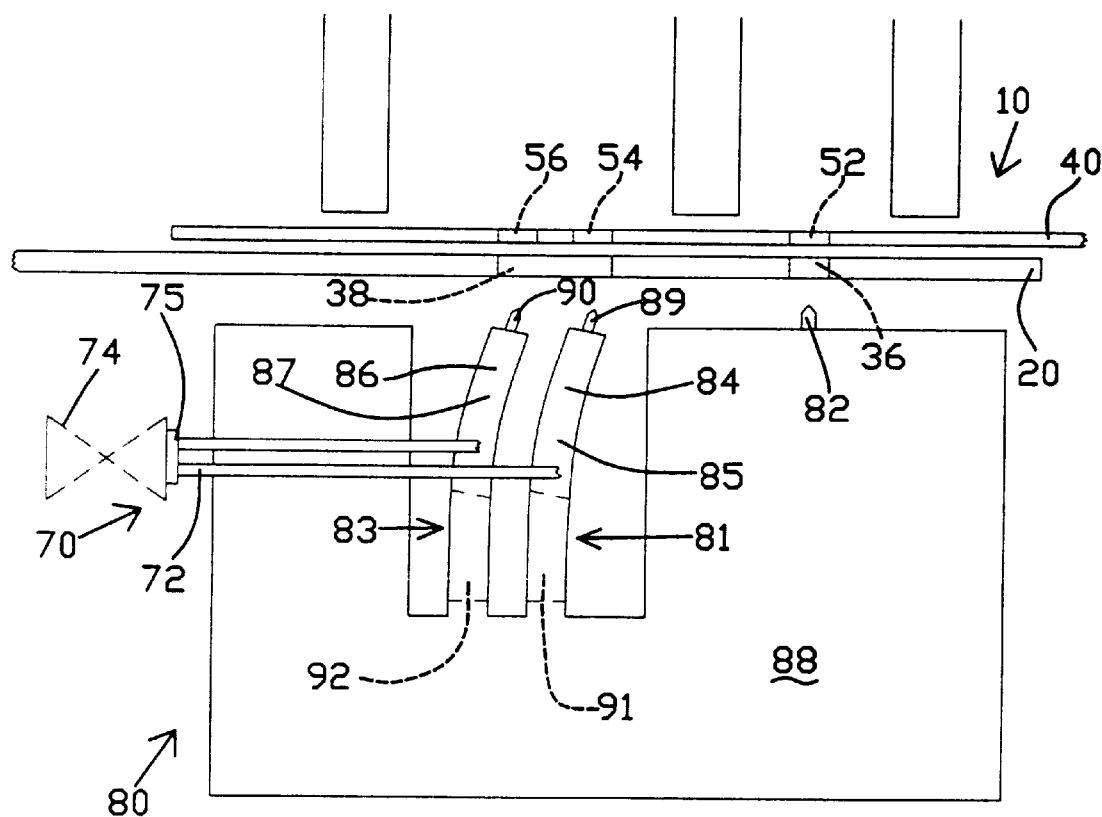
FIG. 8 is a side schematic view of the alignment tool of FIG. 7 with the alignment pins in a pre-sprung state for being positioned in apertures of the head suspension components.
Figure 9:
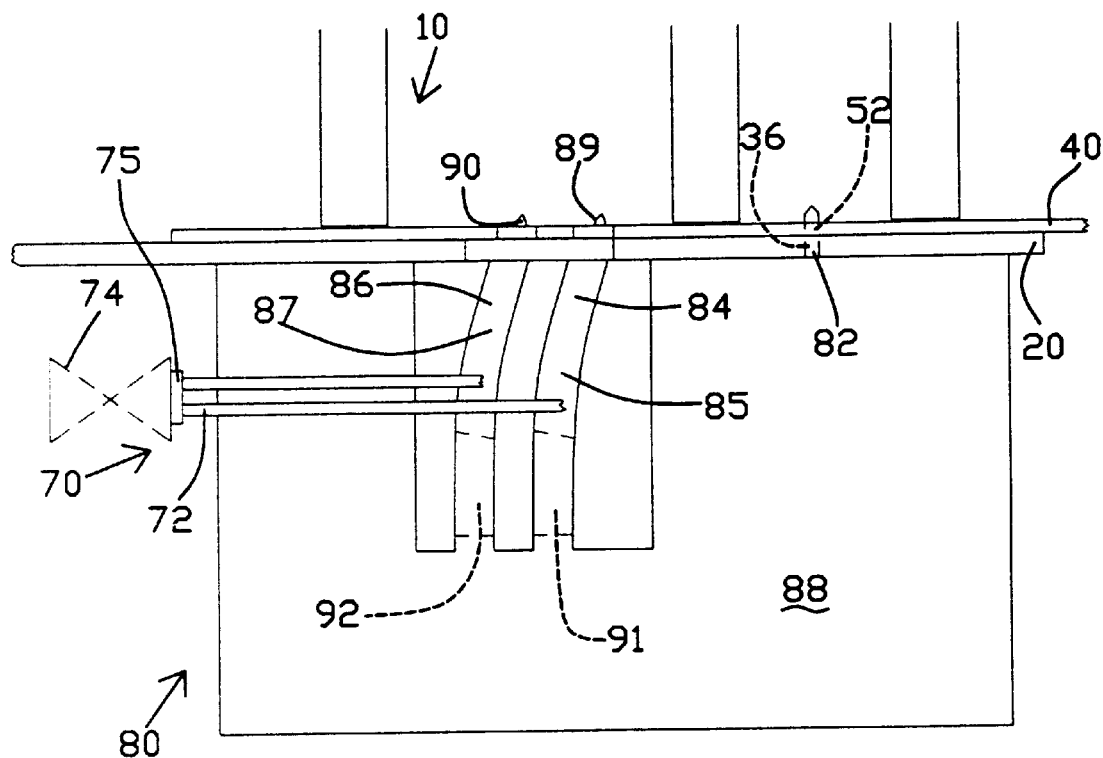
FIG. 9 is a side schematic view of the alignment tool of FIGS. 7 and 8 with the alignment pins engaging the apertures of the head suspension components to align the head suspension components.

An alignment tool useful in aligning head suspension components in the manner described above is shown in FIGS. 7–9. FIG. 7 schematically shows a top view of an alignment tool 80 having a first pin 82, a second pin 84, and a third pin 86, while FIGS. 8 and 9 are side views of alignment tool 80 showing the alignment of the load beam 20 and flexure 40 of FIGS. 1–4 and described above. First pin 82 is inserted through and engages first load beam aperture 36 and first flexure aperture 52 (shown in phantom in FIGS. 8 and 9) of head suspension 10. Second pin 84, on the other hand, is inserted through distal flexure aperture 54 and elongated load beam aperture 38 (shown in phantom in FIGS. 8 and 9), and third pin 86 is inserted through proximal flexure aperture 56 and elongated load beam aperture 38 (shown in phantom in FIGS. 8 and 9). As described in detail above, the configuration of elongated load beam aperture 38, distal flexure aperture 54, and proximal flexure aperture 56 is such that when pin 84 and pin 86 are displaced away from first pin 82, pin 84 independently engages the proximal end 55 of distal flexure aperture 54 and pin 86 independently engages the proximal end 39 of elongated load beam aperture 38. In this manner, alignment tool 80 provides independent tensile forces that align flexure 40 to load beam 20 during the assembly of head suspension 10.

First pin 82 is secured to fixed base 88 of alignment tool 80, and is rigid along its length. Second pin 84 includes a base portion 85 and a top portion 89, while third pin 86 includes base portion 87 and top portion 90. The top portions 89 and 90 of second pin 84 and third pin 86, respectively, are preferably cylindrical in nature to provide the actual structure for engaging the apertures of head suspension 10 in the manner described above. The base portions 85 and 87 of second pin 84 and third pin 86, respectively, are preferably securely attached to fixed base 88, and are preferably rectangular in cross-section and elongated in a direction transverse to the direction of motion of alignment pins 84 and 86. Unlike first pin 82, second pin 84 and third pin 86 are resiliently moveable in the longitudinal direction to assist in the alignment of flexure 40 and load beam 20. Toward this end, base portion 85 of second pin 84 includes a spring region 81, while base portion 87 of third pin 86 includes a spring region 83. A longitudinal slot 91 (shown in phantom) is preferably formed in the base portion 85 and a longitudinal slot 92 (shown in phantom) is formed in the base portion 87 to increase the resiliency of spring regions 81 and 83. Spring regions 81 and 83 permit the resilient longitudinal deflection of second pin 84 and third pin 86, while the transverse elongation of base portions 85 and 87 resist transverse deflection of pins 84 and 86 during the alignment of flexure 40 and load beam 20. Resilient pins 84 and 86 permit the top pin portions 89 and 90 to securely engage the flexure 40 and load beam 20 without damaging these parts.

In a preferred embodiment, first pin 82, second pin 84, and third pin 86 are constructed of A2 grade tool steel. Second pin 84 and third pin 86 are 0.20 inches wide as measured in a transverse direction, and longitudinal slots 91 and 92 are 0.15 inches wide in the transverse direction. These and other dimensions and materials of second and third pins 84 and 86 and slots 91 and 92 can of course be varied to create the desired resiliency for second and third pins 84 and 86.

A number of means for providing the displacement of pins 84 and 86, and hence for providing the longitudinal tension forces to flexure 40 and load beam 20, are contemplated. In the embodiment shown in FIGS. 7–9, the second and third pins 84 and 86, respectively, of alignment tool 80 are longitudinally displaced relative to first pin 82 by an actuation system 70 attached to pins 84 and 86. Actuation system 70 is comprised of four actuation rods 72, two of which are attached on opposite sides of second pin 84 and the other two of which are attached to opposite sides of third pin 86. A cross-piece 75 is attached to the ends of actuation rods 72, and an actuator 74, shown schematically as a spring in FIGS. 8 and 9, is attached to cross-piece 75 for longitudinally actuating the rods 72 and thus deflecting pins 84 and 86. Other configurations of actuation system 70 are contemplated, such as a single actuation rod 72 attached to both second pin 84 and third pin 86 and an actuator 74 attached to the actuation rod 72. Other actuators, for example a pneumatic cylinder, a hydraulic cylinder, a mechanical linkage, combinations thereof, and the like, can also be used. With reference to FIGS. 8 and 9, prior to being inserted in the apertures of head suspension 10 as described above, second pin 84 and third pin 86 are longitudinally displaced toward first pin 82 from a neutral state to a pre-sprung state via actuator 74. First pin 82 is then inserted in first load beam aperture 36 and first flexure aperture 52, while second pin 84 is inserted through elongated load beam aperture 38 and distal flexure aperture 54, and third pin 86 is inserted through elongated load beam aperture 38 and proximal flexure aperture 56. Actuator 74 is then released, thus releasing pins 84 and 86 from the pre-sprung state. Resilient spring regions 81 and 83 of pins 84 and 86, respectively, urge pins 84 and 86 longitudinally away from first pin 82 and back toward the neutral state. This in turn, brings second pin 84 into engagement with the proximal end 55 of distal flexure aperture 54 and third pin 86 into engagement with the proximal end 39 of elongated load beam aperture 38. In this manner, alignment tool 80 provides independent longitudinal tension forces to flexure 40 and load beam 20 to align these head suspension components during the assembly of head suspension 10. The flexure 40 can then be mounted to load beam 20 in a conventional manner, such as by welding. To remove tool 80 from head suspension 10, pins 84 and 86 can then be displaced back toward first pin 82 and into the pre-sprung state by actuator 74 to release pins 84 and 86. Head suspension 10 can then be removed from alignment tool 80.

Figure 10:
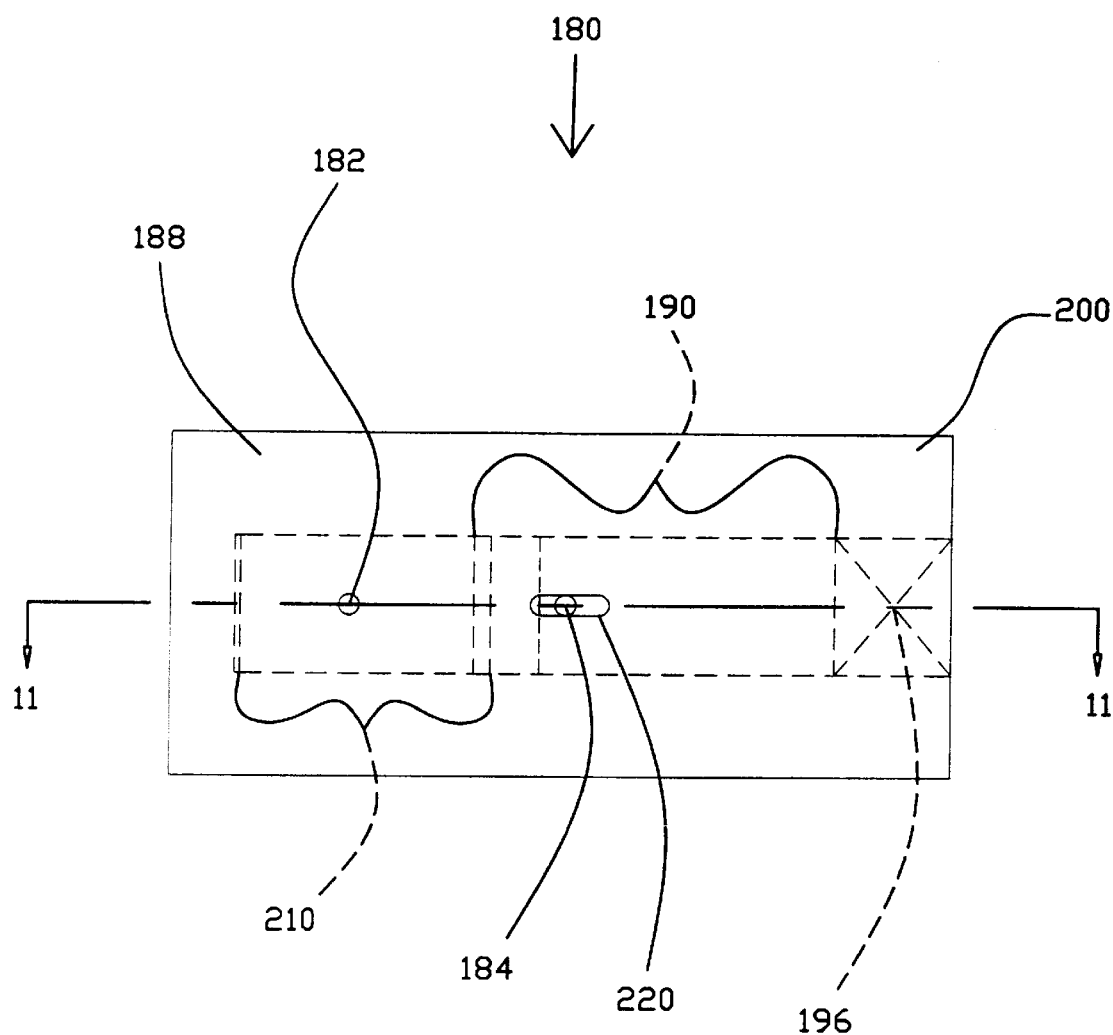
FIG. 10 is a top schematic view of a second embodiment of an alignment tool in accordance with the present invention useful in processing head suspension components.
Figure 11:
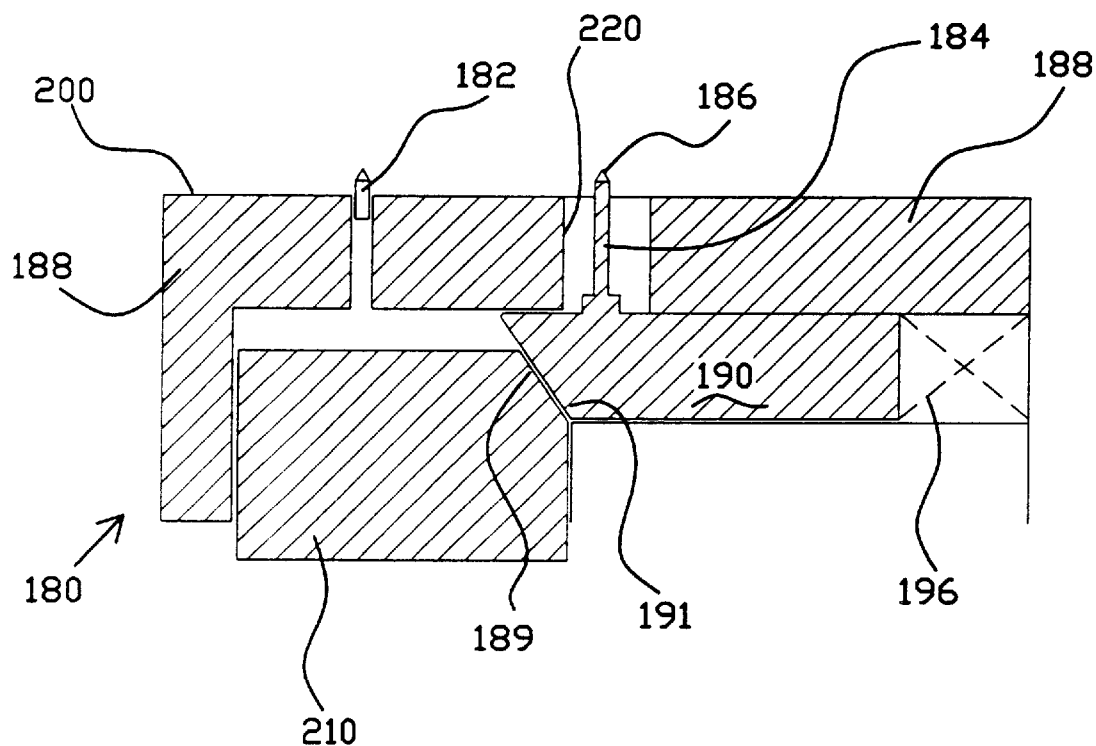
FIG. 11 is a schematic view in cross-section of the alignment tool of FIG. 10 shown taken along line 10—10.

A second means for providing a longitudinal tension force to a head suspension component is included in a second embodiment of an alignment tool shown in FIGS. 10 and 11. Alignment tool 180 is particularly useful for the processing of individual head suspension components, including processes applied after assembly of the load beam and flexure. As with alignment tool 80 of FIGS. 7 and 8, alignment tool 180 includes a first pin 182 rigidly mounted to a fixed base 188 of alignment tool 180 and a flexible second pin 184. First pin 182 is preferably press-fit in a hole in fixed base 188 to enable the efficient removal and replacement of pin 182 as necessary. Second pin 184 is mounted to a moveable base 190 that is operatively positioned adjacent an actuating block 210. Second pin 184 is also resiliently moveable at top portion 186 of pin 184 to prevent damaging the head suspension component. Toward this end, second pin 184 is preferably constructed of M2 grade tool steel, and is 0.13 inches in height. Other materials and dimensions can of course be used to create the desired resiliency in second pin 184. Second pin 184 extends through a slot 220 through the fixed base 188 of tool 180, which longitudinally guides pin 184 and limits transverse deflections of pin 184. Actuating block 210 includes an inclined plane 189, and moveable base 190 includes a cooperating inclined plane 191 (preferably of the same slope) adjacent inclined plane 189 of actuating block 210. A spring 196 is shown schematically positioned between a surface on the opposite side of moveable base 190 than inclined plane 191 and any stationary portion of tool 180. Spring 196 provides a horizontal force to moveable base 190 that keeps inclined plane 191 engaged with the inclined plane 189 of actuating block 210. While alignment tool 180 is shown having only first and second pins 182 and 184, respectively, additional pins can be provided as necessary for engaging apertures in the head suspension component such as for use in an alignment process as described above.

The top surface of alignment tool 180 is adapted to support a head suspension component for processing of the head suspension component, and toward this end, tool 180 includes a processing station 200 at the top surface of the tool. For example, processing station 200 can be used to form a load point dimple in a load beam or a flexure of a head suspension, can be used to mount a head slider to the slider receiving surface of the flexure, or can be used to align individual head suspension components. A head suspension component, such as a load beam, having reference apertures of the type described above is placed on alignment tool 180 in such a manner that first pin 182 is inserted through a first aperture in the load beam to extend above the top surface of the load beam, while second pin 184 is inserted through a second aperture in the load beam to extend above a top surface of the load beam. Actuating block 210 is then subjected to an upward vertical displacement, such as with a pneumatic cylinder or any other known or developed actuation means, causing inclined plane 189 of actuating block 210 to exert a horizontal force on inclined plane 191 of moveable base 190. This in turn longitudinally displaces second pin 184 away from first pin 182, and causes the second aperture of the load beam to be engaged by the second pin 184 of tool 180. Second pin 184 can be flexible to maintain the longitudinal force on the load beam without damaging the load beam. Processing of the load beam, such as forming a load point dimple in the load region of the load beam, can then occur at processing station 200. After processing is completed, a downward vertical displacement is applied to actuating block 210, and spring 196 exerts an opposing horizontal force on moveable base 190. This in turn releases pins 182 and 184 from engagement with the apertures of the load beam. The head suspension component can then be removed from the alignment tool 180.

Although the present invention has been described with reference to preferred embodiments, those skilled in the art will recognize that changes may be made in form and detail without departing from the spirit and scope of the invention.

What is claimed is:

1. A method for manufacturing a head suspension comprising the steps of:

providing a load beam having an actuator mounting region at a proximal end, a load region at a distal end of the load beam, a spring region positioned distally from the actuator mounting region, a rigid region between the spring region and the load region, and a first load beam aperture formed in the load region;

providing a flexure having a gimbal region, a load beam mounting region, and a first flexure aperture formed in the load beam mounting region;

applying a tensile force to the load beam at a point spaced from the first load beam aperture while maintaining the first load beam aperture at a fixed reference location, and thereby longitudinally aligning the load beam at a predetermined orientation;

applying a tensile force to the flexure at a point spaced from the first flexure aperture while maintaining the first flexure aperture at the fixed reference location, and thereby longitudinally aligning the flexure at a predetermined orientation; and mounting the flexure to the load beam.

2. The method for manufacturing a head suspension of claim 1, wherein said step of applying a tensile force to the load beam is done at the same time as said step of applying a tensile force to the flexure.

3. The method for manufacturing a head suspension of claim 2, further including a step of providing a proximal alignment aperture and a distal alignment aperture in one of the load beam and the flexure, and providing an elongated alignment aperture in the other of the load beam and the flexure; and wherein the aligning of the load beam and the flexure is accomplished by applying the tensile forces to the load beam and to the flexure at the elongated alignment aperture and the proximal alignment aperture.

4. The method for manufacturing a head suspension of claim 3, wherein the aligning steps further comprise:

positioning the flexure adjacent the load beam so that the first flexure aperture is adjacent to and is at least partially positioned over the first load beam aperture, and so that the elongated alignment aperture is positioned over at least a portion of each of the proximal alignment aperture and the distal alignment aperture in such a manner that a proximal perimeter edge of the elongated alignment aperture is accessible through the proximal alignment aperture and a proximal perimeter edge of the distal alignment aperture is accessible through the elongated alignment aperture;

providing an alignment tool having a first rigidly fixed pin, a second moveable pin, and a third moveable pin;

inserting the first pin of the alignment tool into the first load beam aperture and the first flexure aperture;

inserting the second pin of the alignment tool through the elongated alignment aperture and the distal alignment aperture;

inserting the third pin of the alignment tool through the elongated alignment aperture and the proximal alignment aperture; and displacing the second and third pins relative to the first pin to engage the second pin with the proximal perimeter edge of the distal alignment aperture and to engage the third pin with the proximal perimeter edge of the elongated alignment aperture to align the flexure to the load beam.

5. The method for manufacturing a head suspension of claim 4, wherein:

the step of providing an alignment tool includes providing an alignment tool having a resiliently moveable second pin and a resiliently moveable third pin; and the step of displacing the second pin and the third pin includes elastically deforming the second pin and the third pin from a neutral state to a pre-sprung state.

6. A method of processing components of a head suspension having apertures, comprising the steps of:

providing an alignment tool having a region, a first pin rigidly mounted to alignment tool, a second pin mounted to the alignment tool, and means for displacing the second pin relative to the first pin;

inserting the first pin through a first aperture in a first head suspension component;

inserting the second pin through a second aperture in the first head suspension component;

displacing the second pin relative to the first pin to engage the first pin with the first head suspension aperture and to engage the second pin with the second head suspension aperture to securely hold the first head suspension component on the alignment tool; and processing the head suspension component.

7. The method of processing head suspension components of claim 6, wherein the processing step includes forming a load point dimple in the first head suspension component.

8. The method of processing head suspension components of claim 6, wherein the processing step includes:

aligning the first head suspension component to a second head suspension component; and fastening the first and second components together.

* * * * *